(12) United States Patent
Line et al.

(10) Patent No.: US 11,897,370 B2
(45) Date of Patent: Feb. 13, 2024

(54) SEATING SOLUTIONS FOR A VEHICLE

(71) Applicant: Ford Global Technologies, LLC, Dearborn, MI (US)

(72) Inventors: Johnathan Andrew Line, Northville, MI (US); Robert Allen Bastuba, Jr., Macomb, MI (US); Collin Joshua Smith, Royal Oak, MI (US); Robert Charles Shipley, Westland, MI (US); Francisco Edgar Guizar, Mexico City (MX); Scott Culver Anderson, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 59 days.

(21) Appl. No.: 17/699,981

(22) Filed: Mar. 21, 2022

(65) Prior Publication Data

US 2023/0294567 A1  Sep. 21, 2023

(51) Int. Cl.
  *B60N 2/02* (2006.01)
  *B60N 2/30* (2006.01)
  *B60N 2/015* (2006.01)
  *B60N 2/14* (2006.01)

(52) U.S. Cl.
  CPC .......... *B60N 2/0292* (2013.01); *B60N 2/305* (2013.01); *B60N 2/3047* (2013.01); *B60N 2/01508* (2013.01); *B60N 2/143* (2013.01)

(58) Field of Classification Search
  CPC .... B60N 2/0292; B60N 2/3047; B60N 2/305; B60N 2/3043; B60N 2/3081; B60N 2/3097; B60N 2/3095; B60N 2/2827; B60N 2/2863; B60N 2/2893; B60N 2002/0212; B60N 2/01508; B60N 2/01583; B60N 2/01558; B60R 21/026; B62D 33/023

USPC ................................................. 296/64, 65.03
  See application file for complete search history.

(56) References Cited

U.S. PATENT DOCUMENTS

| | | | | |
|---|---|---|---|---|
| 5,632,521 A | * | 5/1997 | Archambault | A61G 3/00 |
| | | | | 296/68.1 |
| 7,195,302 B2 | * | 3/2007 | Jovicevic | B60N 2/3047 |
| | | | | 297/14 |
| 7,621,580 B2 | * | 11/2009 | Randjelovic | B60N 2/0735 |
| | | | | 296/65.13 |
| 9,199,553 B2 | | 12/2015 | Cuddihy et al. | |

(Continued)

FOREIGN PATENT DOCUMENTS

FR  2995841 A1 * 3/2014 ............... B60N 2/24
WO  WO-2021209691 A1 * 10/2021 ........... B60N 2/2806

OTHER PUBLICATIONS

Brucamp et al. FR 2995841 A1 machine translation, Mar. 28, 2014 (Year: 2014).*

(Continued)

*Primary Examiner* — Amy R Weisberg
*Assistant Examiner* — Wenwei Zhuo
(74) *Attorney, Agent, or Firm* — Vichit Chea; Price Heneveld LLP

(57) ABSTRACT

A vehicle includes a passenger compartment. A wall is positioned within the passenger compartment. A support structure is positioned on the wall. The support structure defines a series of slots. A seating assembly engages at least one of the slots of the series of slots such that the seating assembly is suspended above a floor of the passenger compartment.

17 Claims, 12 Drawing Sheets

(56) References Cited

U.S. PATENT DOCUMENTS

| | | | |
|---|---|---|---|
| 9,340,126 B2 | 5/2016 | Cuddihy et al. | |
| 9,393,887 B1* | 7/2016 | Beis | B60N 2/015 |
| 10,081,272 B2 | 9/2018 | De Saulles | |
| 10,596,940 B2 | 3/2020 | Zalzala et al. | |
| 11,021,084 B2* | 6/2021 | Sakurai | B60N 2/3047 |
| 2003/0141731 A1* | 7/2003 | Betts | B60N 2/305 |
| | | | 296/24.43 |
| 2007/0052264 A1* | 3/2007 | Lee | B60N 2/3081 |
| | | | 297/188.04 |
| 2010/0007175 A1* | 1/2010 | Mayer | B60R 7/04 |
| | | | 296/190.01 |
| 2011/0156420 A1* | 6/2011 | Yasui | B60N 2/7011 |
| | | | 296/183.1 |
| 2011/0227385 A1* | 9/2011 | Holder | B60N 2/305 |
| | | | 297/337 |
| 2015/0151651 A1* | 6/2015 | Stingle | B60N 2/062 |
| | | | 296/64 |
| 2018/0001792 A1 | 1/2018 | Bruck | |
| 2018/0354394 A1* | 12/2018 | Travieso | B60N 2/062 |
| 2018/0361880 A1* | 12/2018 | Bryant | B60N 2/3047 |
| 2020/0017051 A1* | 1/2020 | Erlacher | B62D 31/025 |
| 2020/0047692 A1* | 2/2020 | Park | G01G 19/12 |
| 2020/0139858 A1* | 5/2020 | Gardner | G06F 3/015 |
| 2020/0290484 A1 | 9/2020 | Line et al. | |
| 2020/0376986 A1 | 12/2020 | Line et al. | |
| 2021/0229572 A1 | 7/2021 | Line et al. | |
| 2022/0009381 A1* | 1/2022 | Winter | B60R 7/08 |

OTHER PUBLICATIONS

U.S. Appl. No. 17/700,018, filed Mar. 21, 2022, Docketed New Case—Ready for Examination, Seating Solutions for a Stationary Vehicle.

U.S. Appl. No. 17/699,952, filed Mar. 21, 2022, Docketed New Case—Ready for Examination, Seat-Mounted Work Surface.

U.S. Appl. No. 17/700,057, filed Mar. 21, 2022, Docketed New Case—Ready for Examination, Seating Solutions for a Stationary Vehicle.

U.S. Appl. No. 17/700,081, filed Mar. 21, 2022, Docketed New Case—Ready for Examination, Seating Solutions for a Stationary Vehicle.

U.S. Appl. No. 17/699,755, filed Mar. 21, 2022, Docketed New Case—Ready for Examination, Vehicle Seating System for a Stationary Vehicle.

U.S. Appl. No. 17/699,781, filed Mar. 21, 2022, Docketed New Case—Ready for Examination, Vehicle Seating System for a Stationary Vehicle.

U.S. Appl. No. 17/699,996, filed Mar. 21, 2022, Docketed New Case—Ready for Examination, Seating Assembly with Swivel Capability.

U.S. Appl. No. 17/700,007, filed Mar. 21, 2022, Docketed New Case—Ready for Examination, Vehicle Floor Panel.

* cited by examiner

SEATING SOLUTIONS FOR A VEHICLE

FIELD OF THE DISCLOSURE

The present disclosure generally relates to a vehicle. More specifically, the present disclosure relates to seating solutions for a stationary vehicle.

BACKGROUND OF THE DISCLOSURE

Vehicles are often provided with one or more seating solutions. Seating solutions provided within a passenger compartment of a vehicle can be a deciding factor in consumers purchase decisions. While all modern OEMs of passenger vehicles currently warn occupants against sitting in the bed of a pickup truck while the vehicle is moving and against laying down while a vehicle is moving due to safety concerns, it is anticipated that technology and the regulatory framework may evolve in the future to where such an activity is safe and permissible.

SUMMARY OF THE DISCLOSURE

According to a first aspect of the present disclosure, a vehicle includes a passenger compartment. A wall is positioned within the passenger compartment. A support structure is positioned on the wall. The support structure defines a series of slots. A seating assembly engages at least one of the slots of the series of slots such that the seating assembly is suspended above a floor of the passenger compartment.

Embodiments of the first aspect of the disclosure can include any one or a combination of the following features:
 the seating assembly includes a seat, wherein the seat includes a seat engagement member that is received within one of the slots of the series of slots;
 the seat of the seating assembly is movable between a stowed position and a deployed position;
 the stowed position of the seat and the deployed position of the seat are displaced from one another by a rotation of the seat about an axis that is parallel to a longitudinal axis of the vehicle;
 the seat is rotated by at least about ninety degrees when the seat is transitioned between the stowed position and the deployed position;
 the seat is rotated by about one-hundred-eighty degrees when the seat is transitioned between the stowed position and the deployed position;
 a surface of the wall provides a seatback of the seating assembly;
 the support structure includes an upper support structure and a lower support structure, wherein the series of slots are defined by each of the upper support structure and the lower support structure;
 the seating assembly includes a seat, wherein the seat includes a seat engagement member that is received within one of the slots of the series of slots defined by the lower support structure;
 the seating assembly includes a seatback, wherein the seatback includes a seatback engagement member that is received within one of the slots of the series of slots defined by the upper support structure;
 the seat and the seatback are each independently suspended above the floor of the passenger compartment;
 the seat engagement member is configured for coupling to a rear side of a primary seating assembly, wherein such coupling of the seat to the rear side of the primary seating assembly enables an auxiliary seating assembly;
 the seat engagement member is configured for coupling to a location on the vehicle that is remote from the passenger compartment;
 the auxiliary seating assembly includes an auxiliary seatback;
 the auxiliary seating assembly includes auxiliary side bolsters that extend from an upper edge of the auxiliary seatback downwardly along at least a portion of right and left sides of the auxiliary seatback; and
 an accessory that is configured for engagement with at least one of the slots of the series of slots.

According to a second aspect of the present disclosure, a vehicle includes a passenger compartment. A wall is positioned within the passenger compartment. A support structure is positioned on the wall. The support structure defines a series of slots. A seating assembly engages at least one of the slots of the series of slots such that the seating assembly is suspended above a floor of the passenger compartment. The seating assembly includes a seat. The seat includes a seat engagement member that is received within one of the slots of the series of slots. The seat of the seating assembly is movable between a stowed position and a deployed position. The stowed position of the seat and the deployed position of the seat are displaced from one another by a rotation of the seat about an axis that is parallel to a longitudinal axis of the vehicle.

Embodiments of the second aspect of the present disclosure can include any one or a combination of the following features:
 the seat is rotated by about one-hundred-eighty degrees when the seat is transitioned between the stowed position and the deployed position;
 the seat engagement member is configured for coupling to a rear side of a primary seating assembly, wherein such coupling of the seat to the rear side of the primary seating assembly enables an auxiliary seating assembly; and
 the seat engagement member is configured for coupling to a location on the vehicle that is remote from the passenger compartment, wherein the location on the vehicle that is remote from the passenger compartment is a cargo area of the vehicle.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
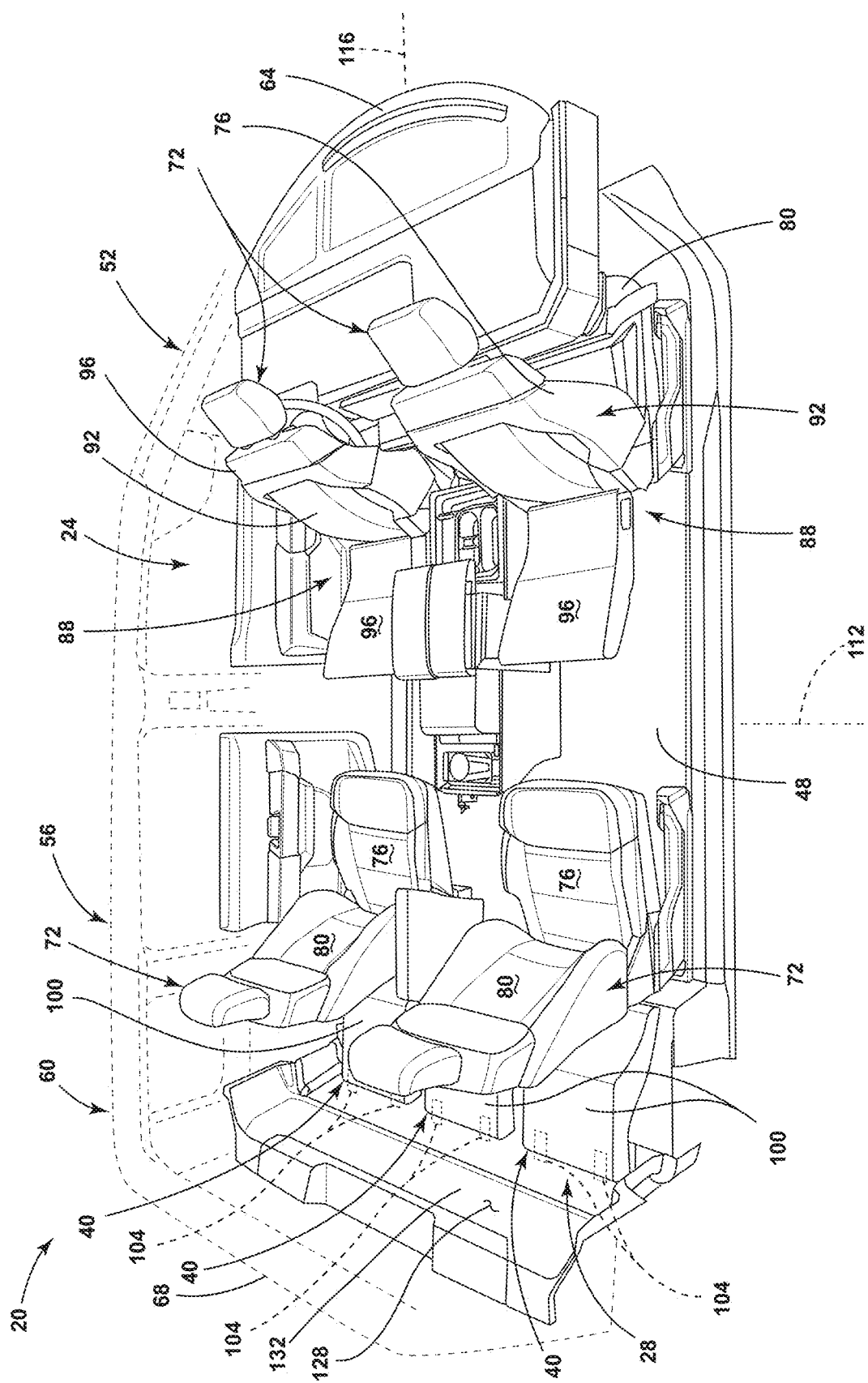
FIG. 1 is a side perspective view of a passenger compartment of a vehicle, illustrating seating assemblies and auxiliary seating assemblies, according to one exemplary arrangement when the vehicle is in a stationary non-moving state.
Figure 2:
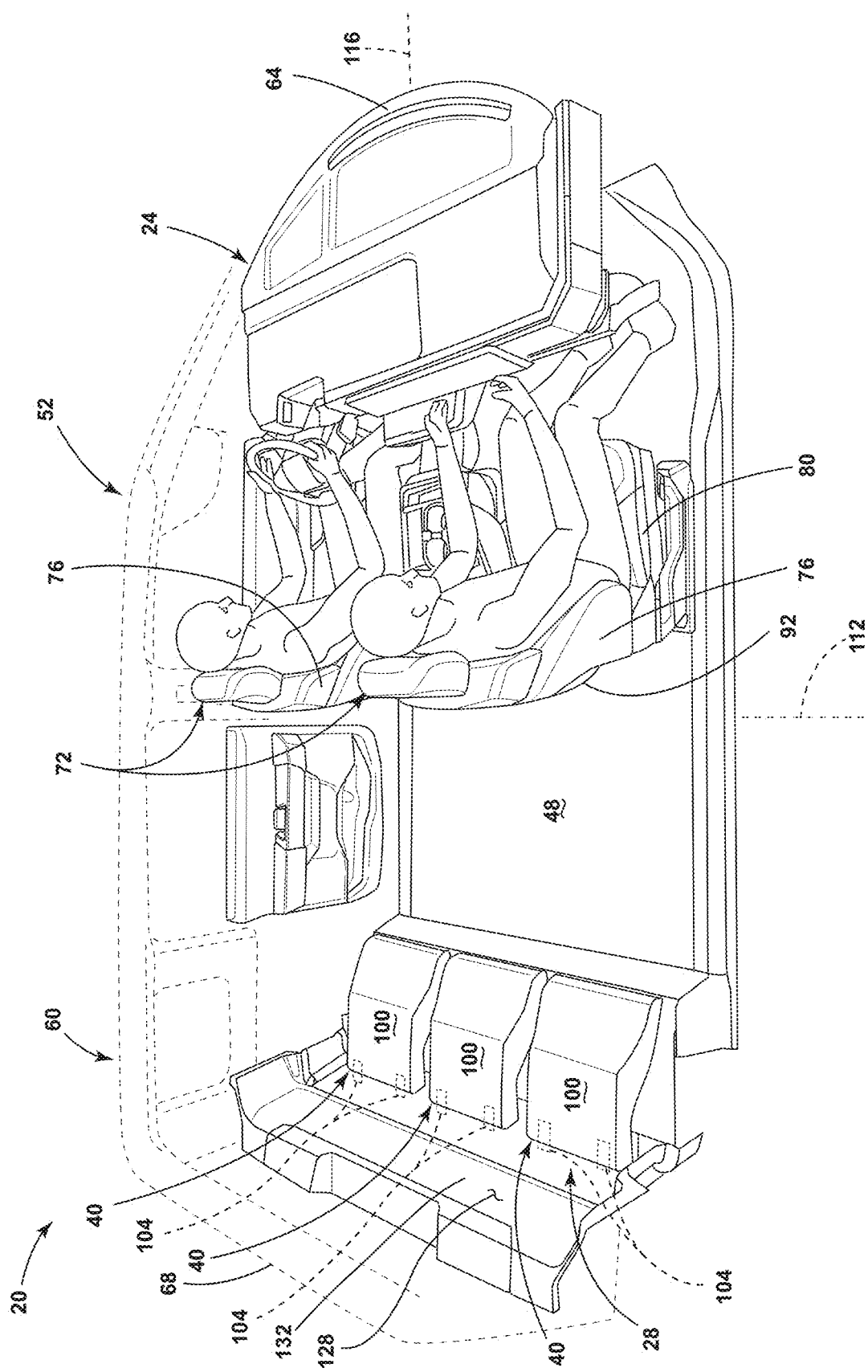
FIG. 2 is a side perspective view of the passenger compartment of the vehicle, illustrating a stowed position of some of the seating assemblies, according to another exemplary arrangement.
Figure 3:
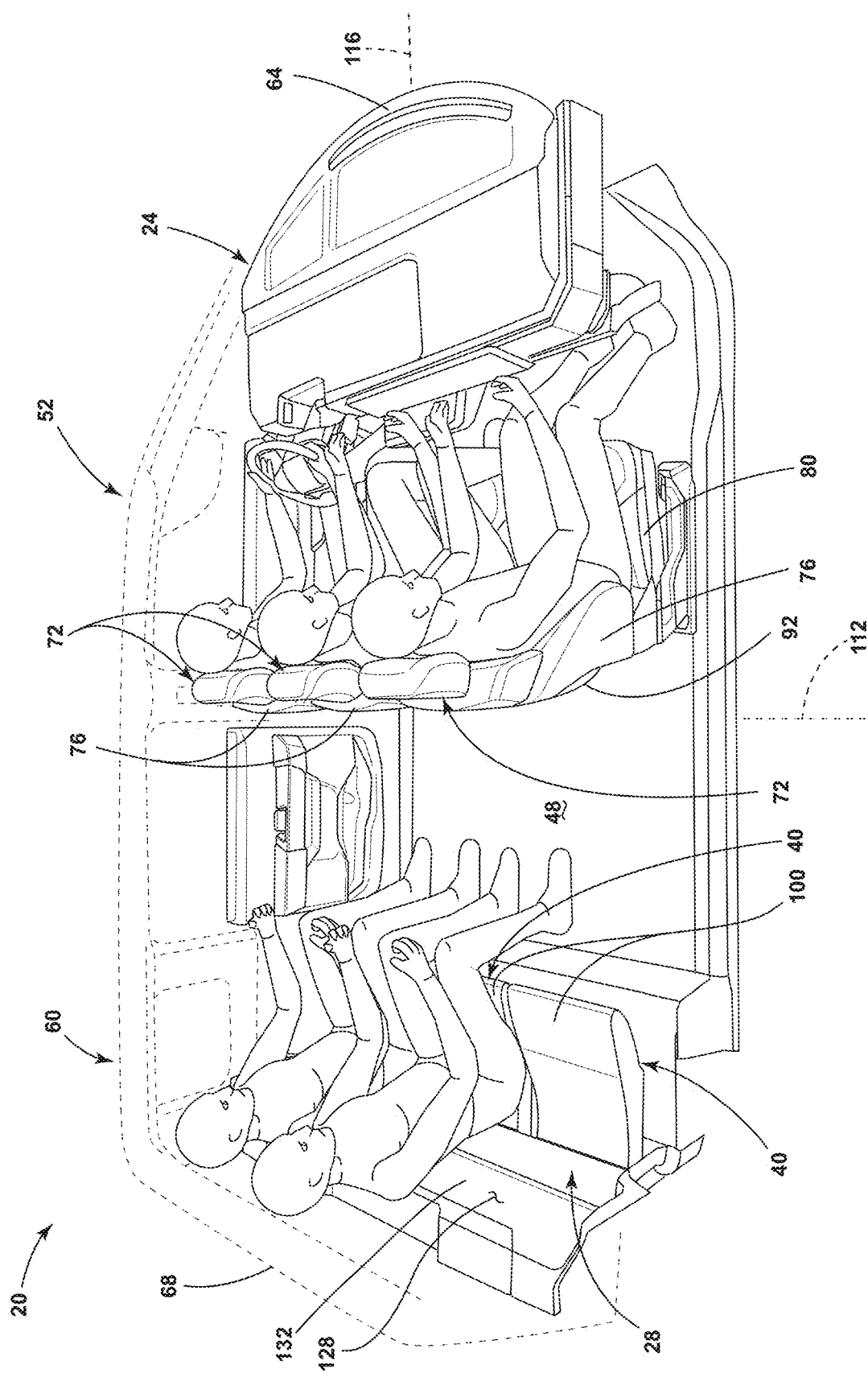
FIG. 3 is a side perspective view of the passenger compartment of the vehicle, illustrating a deployed position of some of the seating assemblies, according to another exemplary arrangement.
Figure 4:
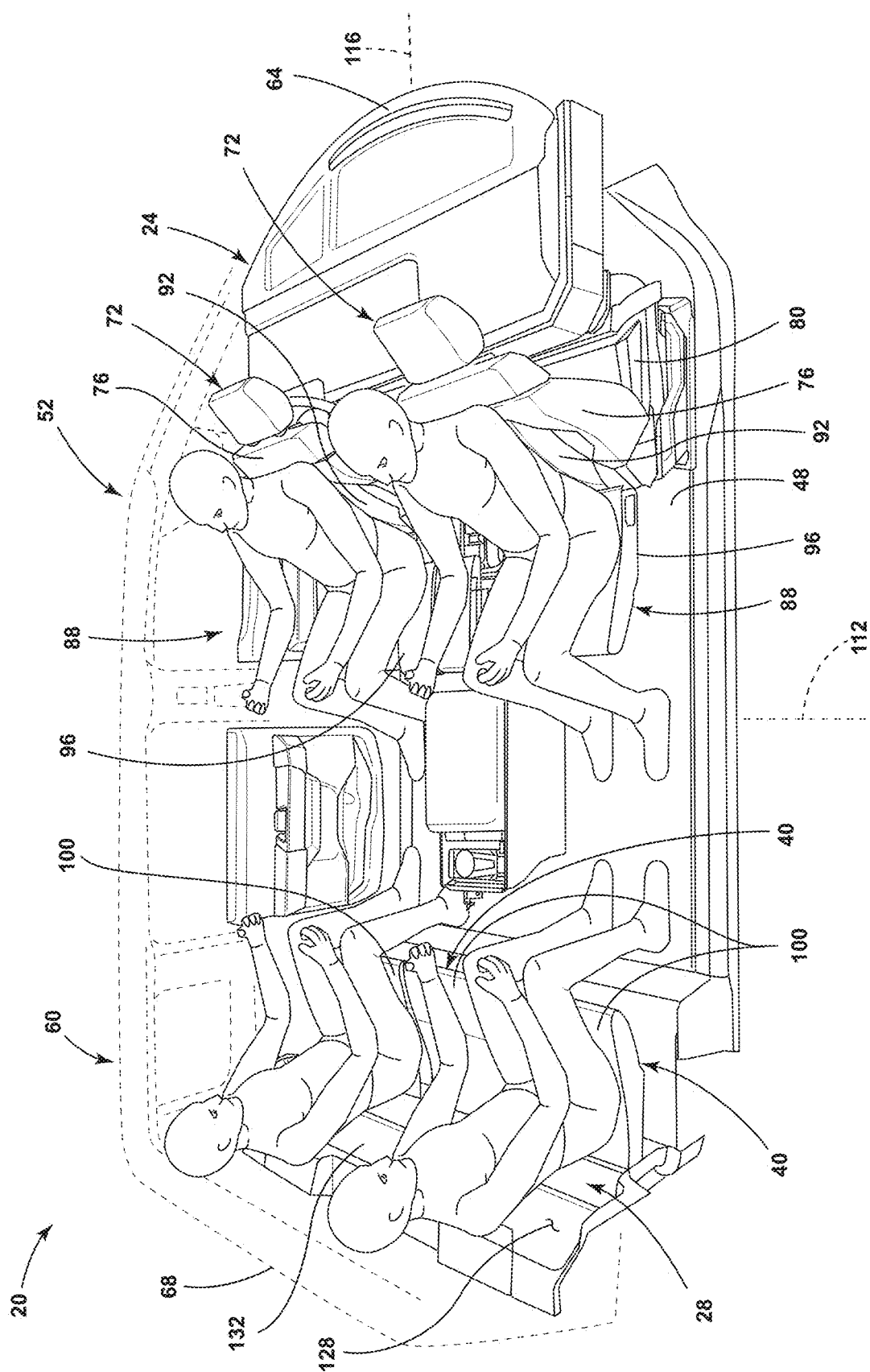
FIG. 4 is a side perspective view of the passenger compartment of the vehicle, illustrating seating assemblies and auxiliary seating assemblies, according to another exemplary arrangement when the vehicle is in the stationary non-moving state.
Figure 5:
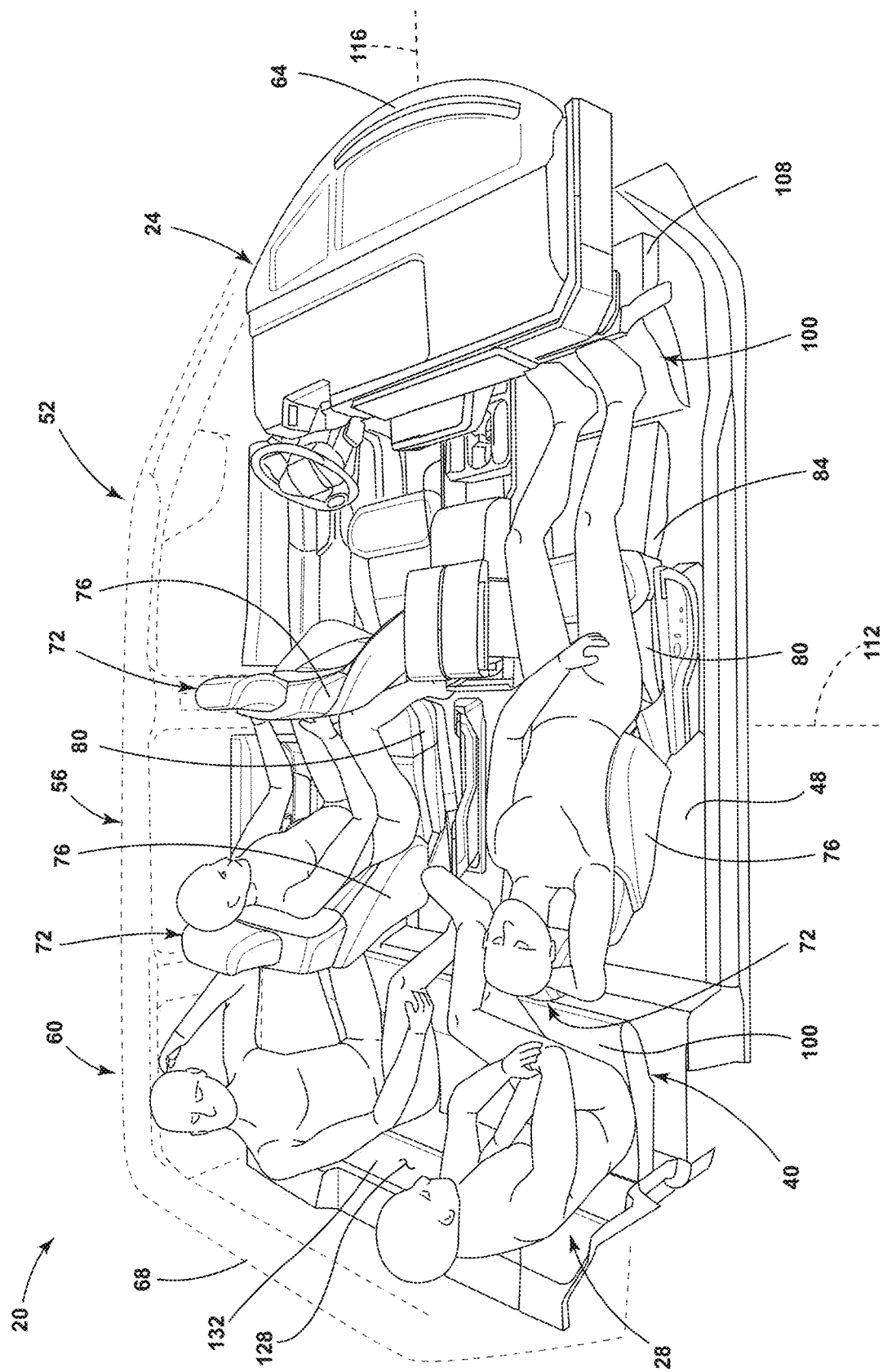
FIG. 5 is a side perspective view of the passenger compartment of the vehicle, illustrating seating assemblies and auxiliary seating assemblies, according to another exemplary arrangement when the vehicle is in the stationary non-moving state.
Figure 6:
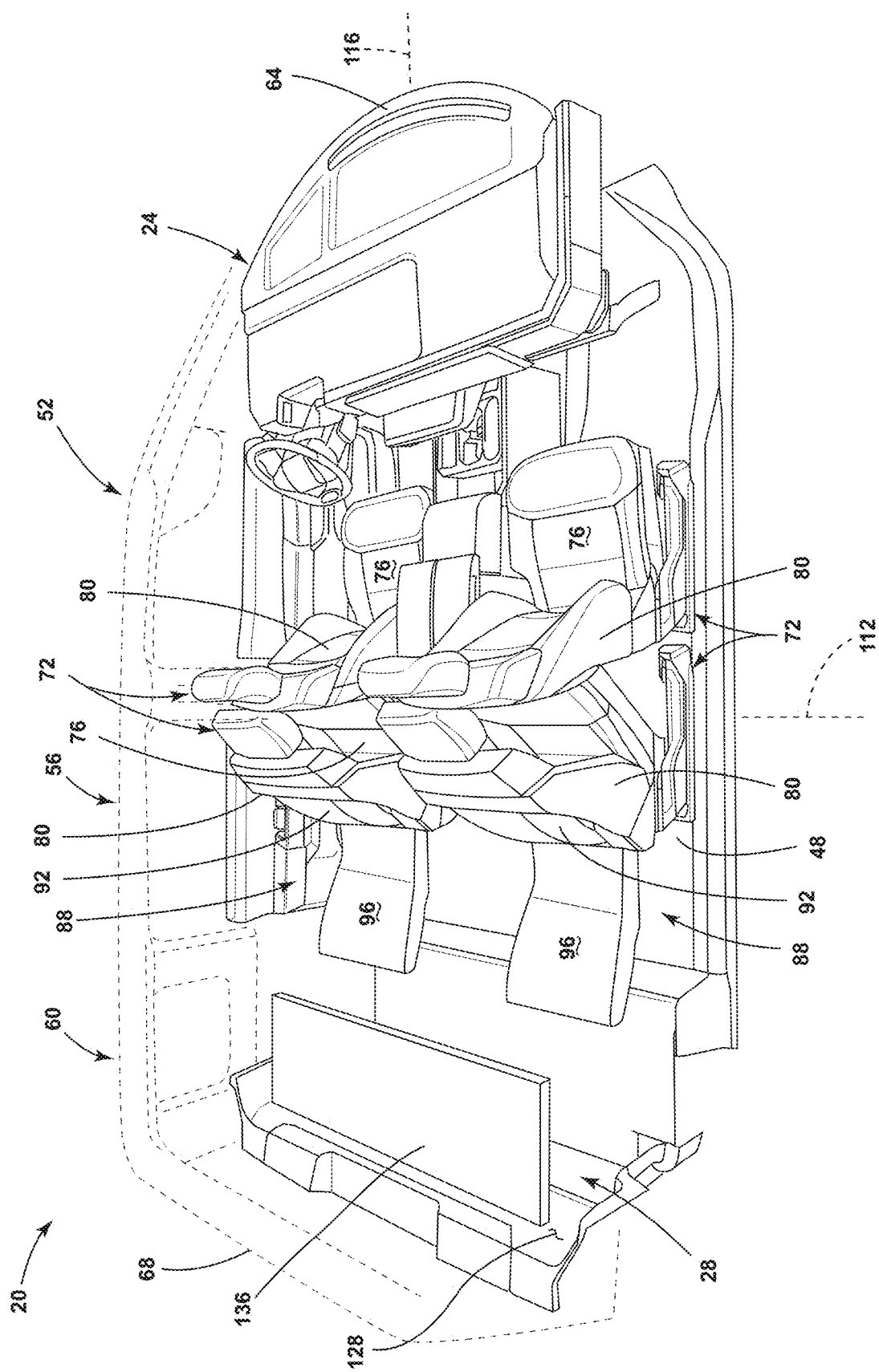
FIG. 6 is a side perspective view of the passenger compartment of the vehicle, illustrating seating assemblies, auxiliary seating assemblies, and a work surface, according to another exemplary arrangement when the vehicle is in the stationary non-moving state.
Figure 7:
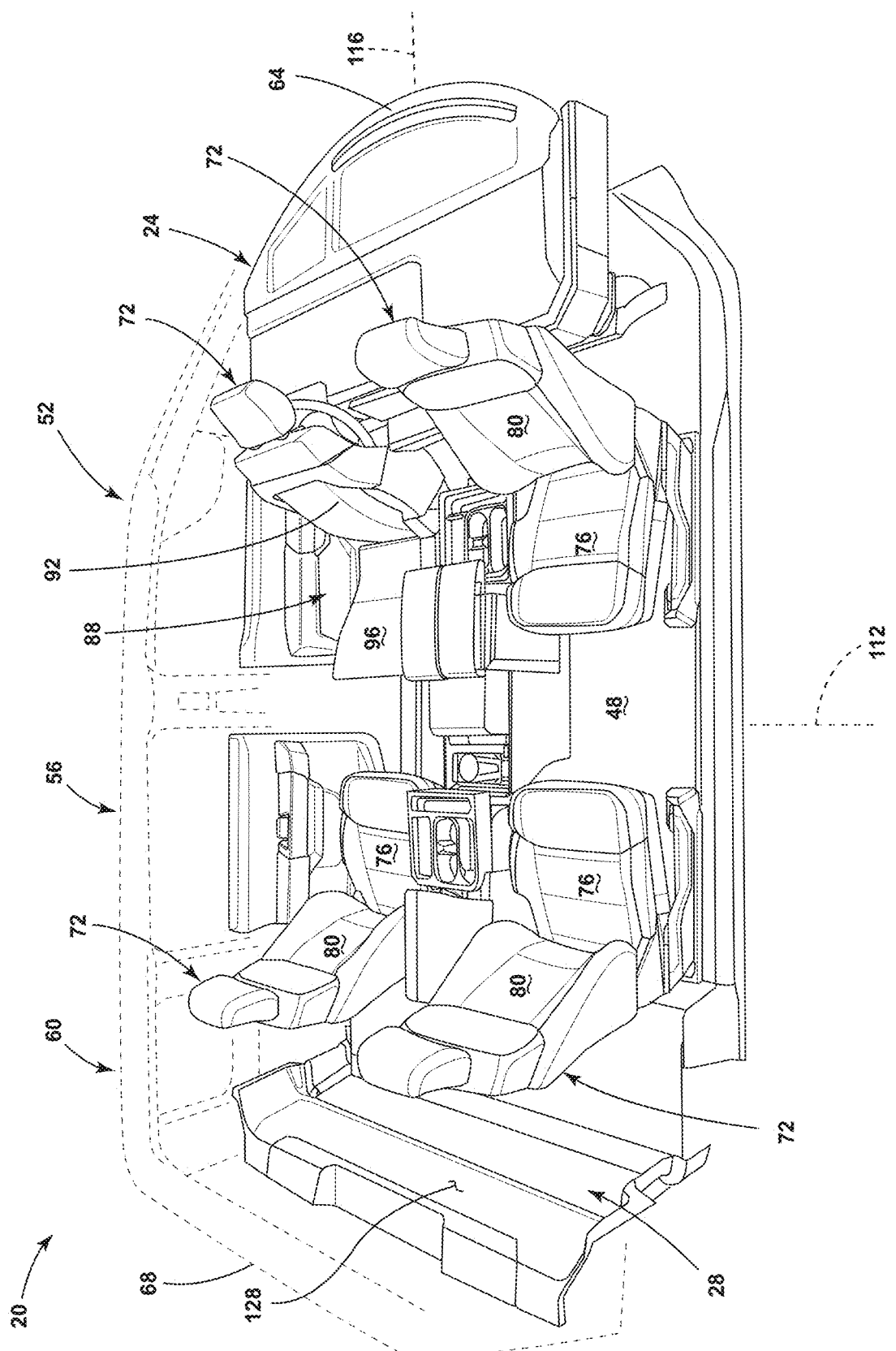
FIG. 7 is a side perspective view of the passenger compartment of the vehicle, illustrating seating assemblies and auxiliary seating assemblies, according to another exemplary arrangement when the vehicle is in the stationary non-moving state.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to seating solutions for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-12, reference numeral 20 generally designates a vehicle. The vehicle 20 may be a motor vehicle. While the vehicle 20 may be a motor vehicle, the present disclosure is not limited to internal combustion engines as a source of locomotive power for the vehicle 20. Rather, alternative sources may be utilized in providing locomotive power to the vehicle 20. For example, locomotive power may be provided to the vehicle 20 by electric motors, fuel cells, and/or petroleum-based fuel engines. According to various examples, the vehicle 20 may be driver-controlled, semi-autonomous, fully-autonomous, or any combination of user-controlled and automated. For example, the semi-autonomous example of the vehicle 20 may perform many, or all, commuting functions (e.g., accelerating, breaking, turning, signaling, etc.) independent of user interaction while the user maintains override control of the vehicle 20. The vehicle 20 includes a passenger compartment 24. A wall 28 is positioned within the passenger compartment 24. A support structure 32 is positioned on the wall 28. The support structure 32 defines a series of slots 36. A seating assembly 40 engages at least one of the slots 44 of the series of slots 36 such that the seating assembly 40 is suspended above a floor 48 of the passenger compartment 24.

Referring again to FIGS. 1-12, while modern OEMs of passenger vehicles would currently warn against using one of the arrangements depicted in FIGS. 1 and 4-7 while the vehicle 20 is in motion due to safety concerns, it is anticipated that technology and the regulatory framework may evolve in the future to where such an activity is safe and permissible. In some examples, the vehicle 20 may be provided with functionality that prevents the vehicle 20 from transitioning out of the stationary non-moving state while the passenger compartment 24 is arranged in one of the arrangements depicted in FIGS. 1 and 4-7. For example, the vehicle 20 may be provided with the ability to prevent a transmission from shifting into a gear that facilitates motion of the vehicle 20 (e.g., drive or reverse) while the passenger compartment 24 is arranged as depicted in one of the arrangements depicted in FIGS. 1 and 4-7.

Referring now to FIGS. 1-7, the vehicle 20 can include a first row of seating assemblies 52, a second row of seating assemblies 56, and/or a third row of seating assemblies 60. The first row of seating assemblies 52 may be positioned nearest a front 64 of the vehicle 20 and/or the passenger compartment 24. The third row of seating assemblies 60 may be positioned nearest to a rear 68 of the vehicle 20 and/or the passenger compartment 24. The second row of seating assemblies 56 may be positioned at an intermediate location between the first and second rows of seating assemblies 52, 60. The first row of seating assemblies 52 and the second row of seating assemblies 56 can be provided with seating assemblies 72 that differ from the seating assemblies as will be discussed in further detail herein. The seating assemblies 72 can each include a seat 76 and a seatback 80. The seat 76 and the seatback 80 of the seating assemblies 72 may be coupled to one another (e.g., by an intermediate structure) such that the seatback 80 is pivotable relative to the seat 76 and the seat 76 is pivotable relative to the seatback 80 (see FIG. 6). In some examples, the seating assemblies 72 may include a lower leg support 84 (see FIG. 5). In such an example, the lower leg support 84 may be rotatably coupled to a front end of the seat 76 such that the lower leg support 84 is rotatable relative to the seat 76.

Referring again to FIGS. 1-7, in various examples, one or more of the seating assemblies 72 may be provided with the ability to swivel or rotate about a vertical axis, where the vertical axis extends through the seat 76. Accordingly, such an example of the seating assembly 72 may be capable of being oriented in a forward-facing position and/or a rearward-facing position (see FIG. 7). In some examples, one or more of the seating assemblies 72 may be provided with an auxiliary seating assembly 88 for use while the vehicle 20 is in the stationary non-moving state. The auxiliary seating assembly 88 can be coupled to a rearward surface of the seatback 80 thereof. In such examples, an auxiliary seatback 92 may be carried by the rearward surface of the corresponding seatback 80. The auxiliary seatback 92 may be provided with a cushion portion that can enhance comfort of a user when seated in the auxiliary seating assembly 88. An auxiliary seat 96 can be coupled to the rear side of the seatback 80 and movable between a stowed position and a deployed position. For example, the auxiliary seat 96 may be pivotably coupled to a lower region of the rear side of the seatback 80. In such an example, pivotable motion of the auxiliary seat 96 in an upward direction from the deployed position can accomplish the stowed position, whereby the auxiliary seat 96 is placed in an abutting relationship with the rear side of the seatback 80 and/or the auxiliary seatback 92. In some examples, the seating assembly 40, or a portion of the seating assembly 40, may be removably coupled to the wall 28. In such an example, the seating assembly 40, or the portion of the seating assembly 40, can be configured for engagement with the seatback 80 of the seating assembly 72 such that the seating assembly 40, or the portion of the seating assembly 40, may be employed as the auxiliary seat 96.

Referring further to FIGS. 1-7, the seating assembly 40 can include a seat 100. The seat 100 can include one or more seat engagement members 104 that are received within one of the slots 44 of the series of slots 36. The seat engagement member(s) 104 may be configured such that they can be received within the slots 44 of the series of slots 36, as well as received by the seatbacks 80 of the seating assemblies 72. Accordingly, the seat 100 of the seating assembly 40 may be employed in a variety of locations within the passenger compartment 24 of the vehicle 20 to provide alternative seating arrangements. In some examples, the seat 100 of the seating assembly 40 may be removed from the slots 44 and employed as a foot rest 108 in alternative locations within the passenger compartment 24 (see FIG. 5).

Referring still further to FIGS. 1-7, the seat 100 of the seating assembly 40 can be movable between a stowed position and a deployed position. For example, the seat 100 may be rotatably coupled to the wall 28 such that the stowed position of the seat 100 is represented by the seat 100 being in a generally vertical orientation relative to the wall 28 (e.g., a stadium-style or theater-style seating assembly). In such an example, the stowed position and the deployed position of the seat 100 of the seating assembly 40 may be displaced from one another by rotational motion about an axis that is parallel to a lateral axis 112 of the vehicle 20. In alternative examples, the stowed position of the seat 100 and the deployed position of the seat 100 may be displaced from one another by a rotation of the seat 100 about an axis that is parallel to a longitudinal axis 116 of the vehicle 20. For example, the position of the seats 100 of the seating assemblies 40 depicted in FIGS. 1 and 2 may represent the stowed position of the seats 100, where an underside of the seats 100 is presented to a user if the user were to attempt to access the third row of seating assemblies 60. Transitioning the seats 100 from the stowed position depicted in FIGS. 1 and 2 to the deployed position depicted in FIGS. 3-5 may be accomplished by grasping the seat 100 and pulling in a vehicle-forward direction (i.e., toward the front 64) in a manner that disengages the seat engagement members 104 from corresponding slots 44 of the series of slots 36. Once the seat engagement members 104 have cleared the corresponding slots 44, the seat 100 may be rotated about an axis that is parallel to the longitudinal axis 116 of the vehicle 20. In so doing, the underside of the seat 100 that was previously facing in an upward direction is now presented toward the floor 48 of the passenger compartment 24.

Referring yet again to FIGS. 1-7, once the seat 100 has been rotated about the axis parallel to the longitudinal axis 116 (e.g., a rotation of about 180°), then the seat 100 may be engaged with the wall 28 by way of the series of slots 36. For example, the seat engagement members 104 may be reinserted into the corresponding slots 44 of the series of slots 36 in a manner that suspends the seat 100 above the floor 48. In some examples, the seat engagement members 104 may have a generally arcuate portion that can engage with a bar 120 that is positioned on a rearward side of the seating assemblies 72 (see FIGS. 8 and 9). In such an example, a similar structure to the bar 120 may be provided within the wall 28 such that the curved or arcuate portions of the seat engagement member 104 may engage with such a structure in the wall 28 when the seats 100 are in the deployed position. For example, a tubular structure 124 may be provided in the wall 28, with the series of slots 36 being arranged such that at least some of the slots 44 enable access to the tubular structure 124 (see FIG. 10). It is contemplated that, in such an example, the tubular structure 124 and the bar 120 may permit rotational motion of the seat engagement members 104 there about such that the seat 100 may be rotationally transitioned between stowed positions and deployed positions that are displaced from one another by about ninety degrees (90°). In some examples, a surface 128 of the wall 28 may provide a seatback 132 of the seating assembly 40.

Referring again to FIGS. 1-7, the seating assemblies 72 may be removable to provide alternative arrangements and uses for the passenger compartment 24. In some examples, a work surface 136 may be rotatably coupled to the wall 28 of the passenger compartment 24. Alternatively, the work surface 136 may be configured for removably coupling with some of the slots 44 of the series of slots 36. In such an example, when a user desires to make use of the work surface 136, the seats 100 of the seating assemblies 40 may be employed as the auxiliary seats 96 of auxiliary seating assembly 88, thereby enabling a desk configuration or table configuration of the passenger compartment 24 (see FIG. 6). The seating arrangements depicted in FIGS. 1, 4, 6, and 7 may be referred to as social arrangements, conferencing arrangements, and/or remote office arrangements. These social arrangements, conferencing arrangements, and/or remote office arrangements are intended for use when the vehicle 20 is in a stationary non-moving state (e.g., when the vehicle 20 is parked). Similarly, the seating arrangement depicted in FIG. 5 may be referred to as a resting arrangement and is intended for use when the vehicle 20 is in the stationary non-moving state.

Figure 8:
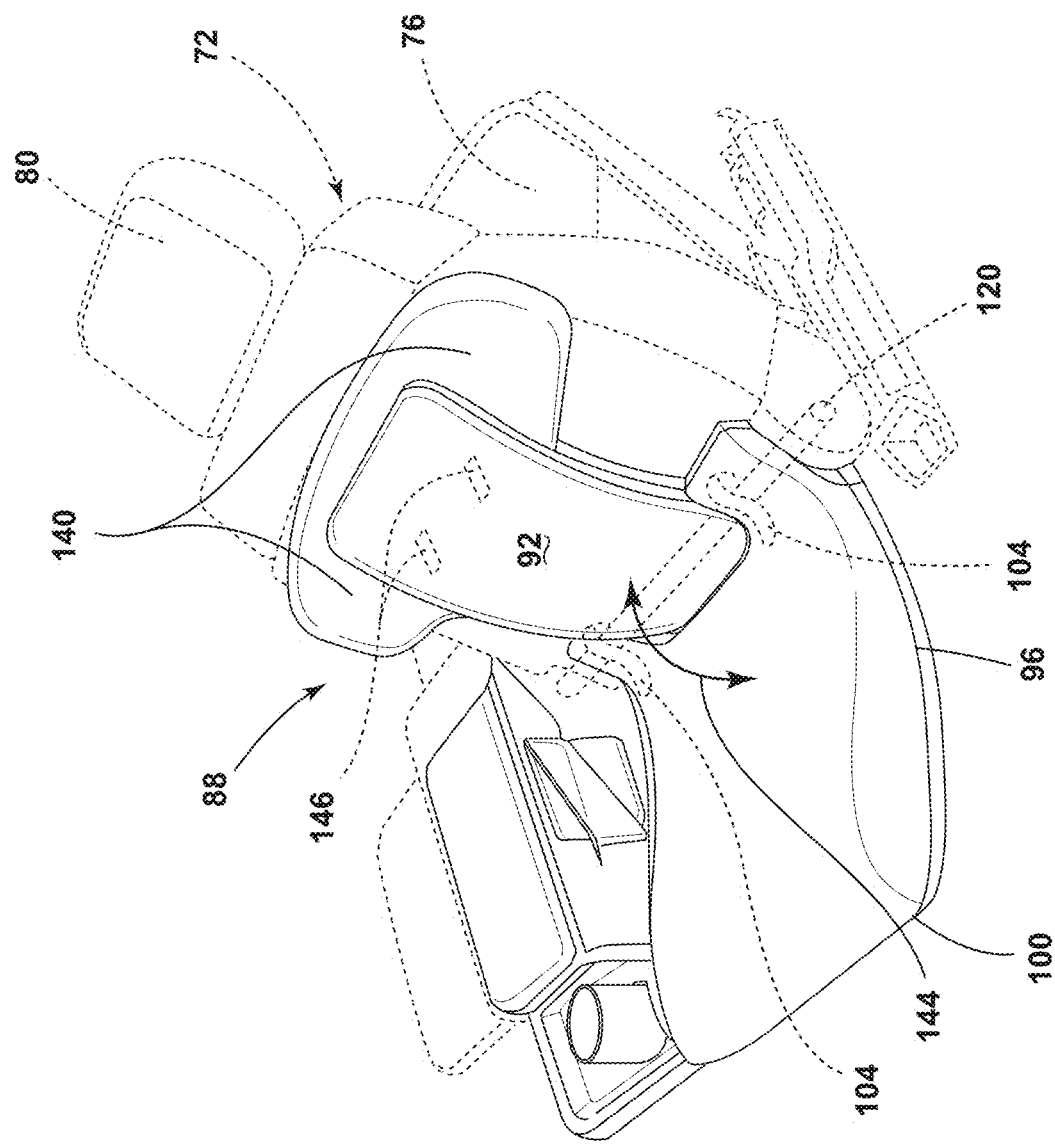
FIG. 8 is a rear perspective view of a primary seating assembly equipped with an auxiliary seating assembly, illustrating an auxiliary seat in a deployed position, according to one example.
Figure 9:
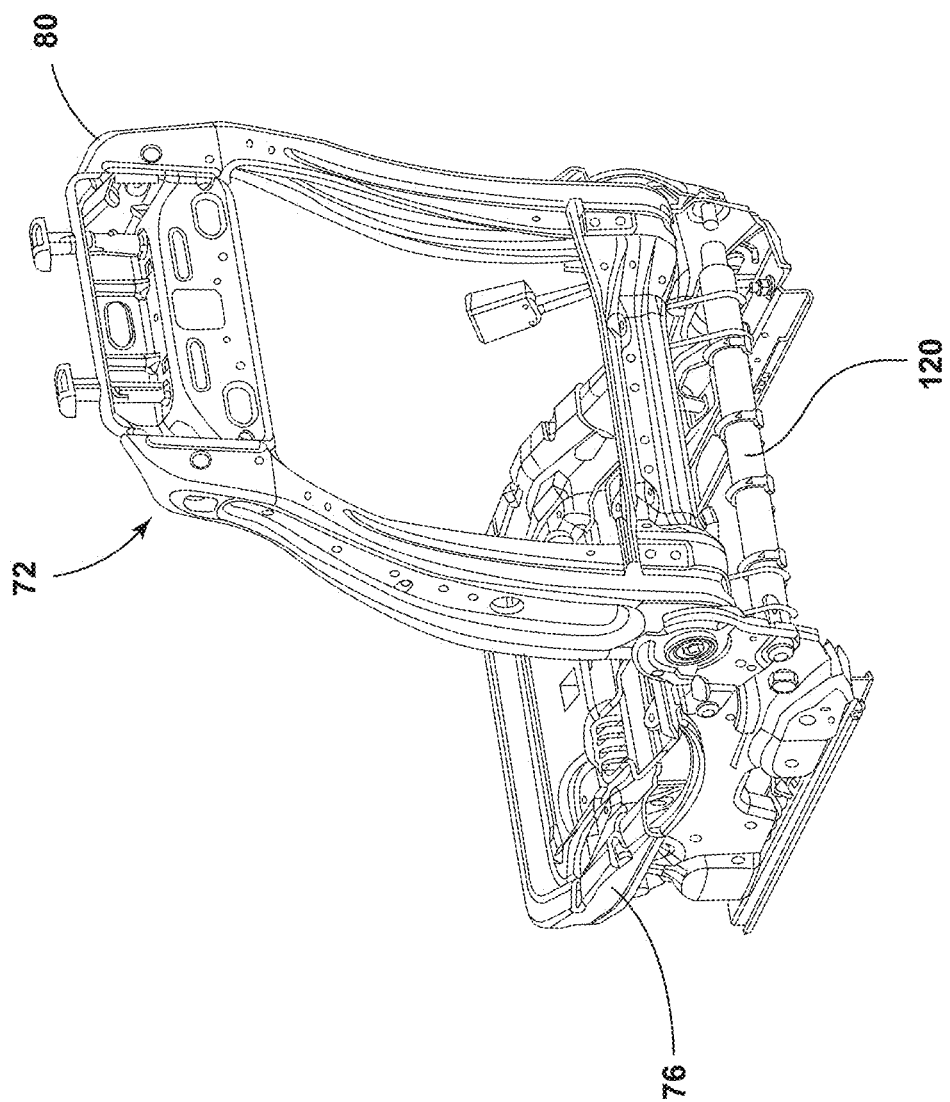
FIG. 9 is a rear perspective view of the seating assembly, illustrating structural components thereof, according to one example.
Figure 10:
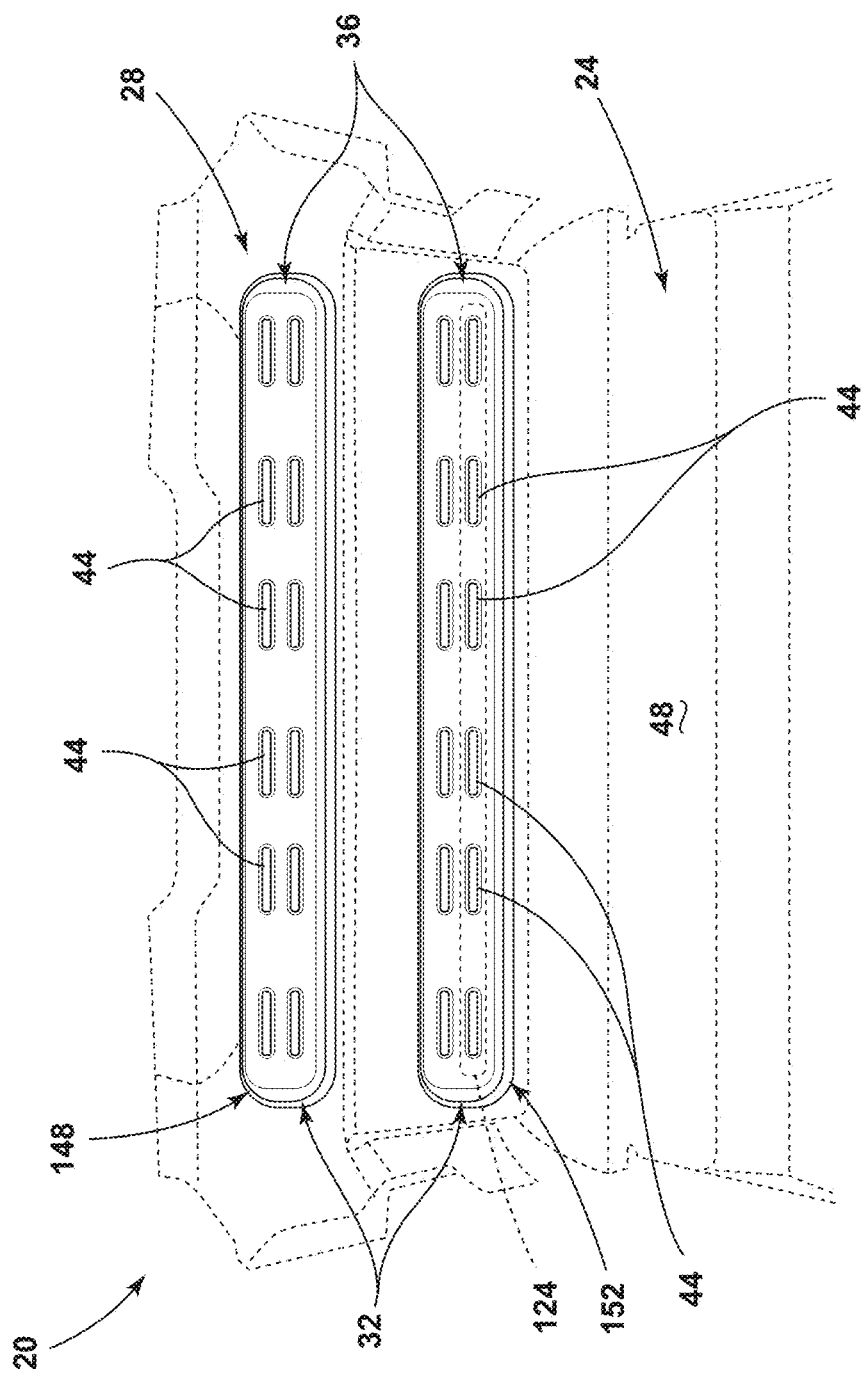
FIG. 10 is a front perspective view of a wall of the passenger compartment, illustrating a plurality of support structures thereon, according to one example.

Referring now to FIGS. 8-10, in some examples, the auxiliary seating assembly 88 can include auxiliary side bolsters 140 that are coupled to the seatback 80 of the seating assembly 72. The auxiliary side bolsters 140 may extend from an upper edge of the auxiliary seatback 92 downwardly along at least a portion of right and left sides of the auxiliary seatback 92. As stated above, the auxiliary seat 96 may be the seat 100 from the seating assembly 40. As also stated above, the auxiliary seat 96 may be pivotable relative to the seatback 80, as indicated by arrow 144, such that the auxiliary seat 96 may be rotatable between a vertically stowed position and a deployed position. In various examples, the seat engagement members 104 may be provided with a curved or arcuate portion that engages with the bar 120 that extends laterally across a rearward portion of the seating assembly 72. In such an example, the curved or arcuate portions of the seat engagement members 104 may maintain contact with the bar 120 when the auxiliary seat 96 is in either the vertically stowed position or the deployed position. Accordingly, the seat engagement members 104 can remain coupled to the seating assembly 72 until such time that a user elects to decouple the auxiliary seat 96 and/or seat 100 from the seating assembly 72.

Referring again to FIGS. 8-10, in some examples, the auxiliary seatback 92 may be employed as the seatback 132 of the seating assembly 40. In other words, as with the seat 100, the seatback 132 may be removable and configured for use in a variety of locations within the passenger compartment 24. In various examples, the auxiliary seatback 92 and/or the seatback 132 may be provided with seatback engagement members 146 that are similar to the seat engagement members 104. The seatback engagement members 146 may have the same, or similar, structures and/or operation as the seat engagement members 104. Accordingly, the above discussion regarding the structure of the seat engagement members 104 can equally apply to the seatback engagement members 146 provided on the seatbacks 132 of the seating assemblies 40. In some examples, as with the seat engagement members 104, the seatback engagement members 146 may be provided with a curved or arcuate portion that engages with a structure similar to the bar 120 and/or the tubular structure 124.

Figure 11:
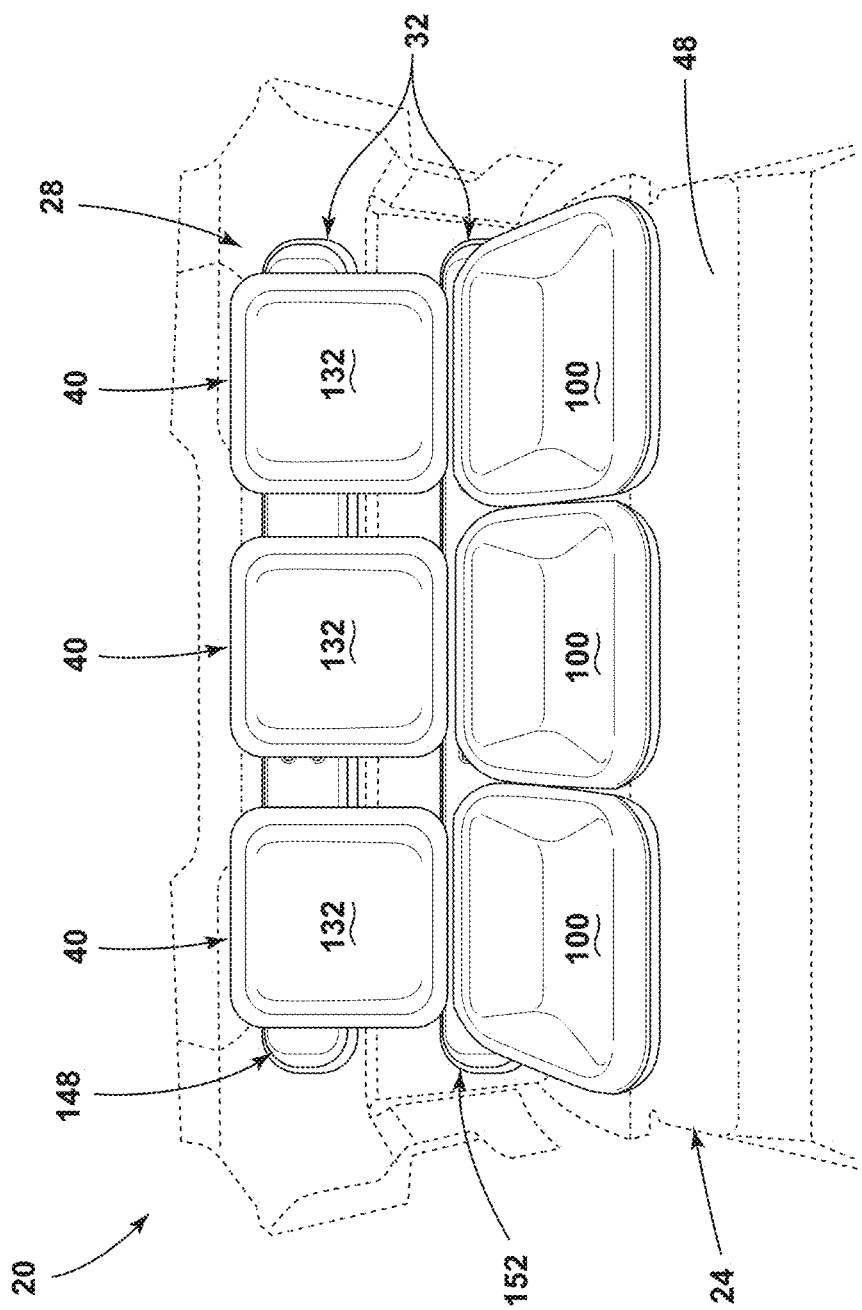
FIG. 11 is a front perspective view of the wall of the passenger compartment, illustrating seating assemblies coupled to the plurality of support structures, according to one example.
Figure 12:
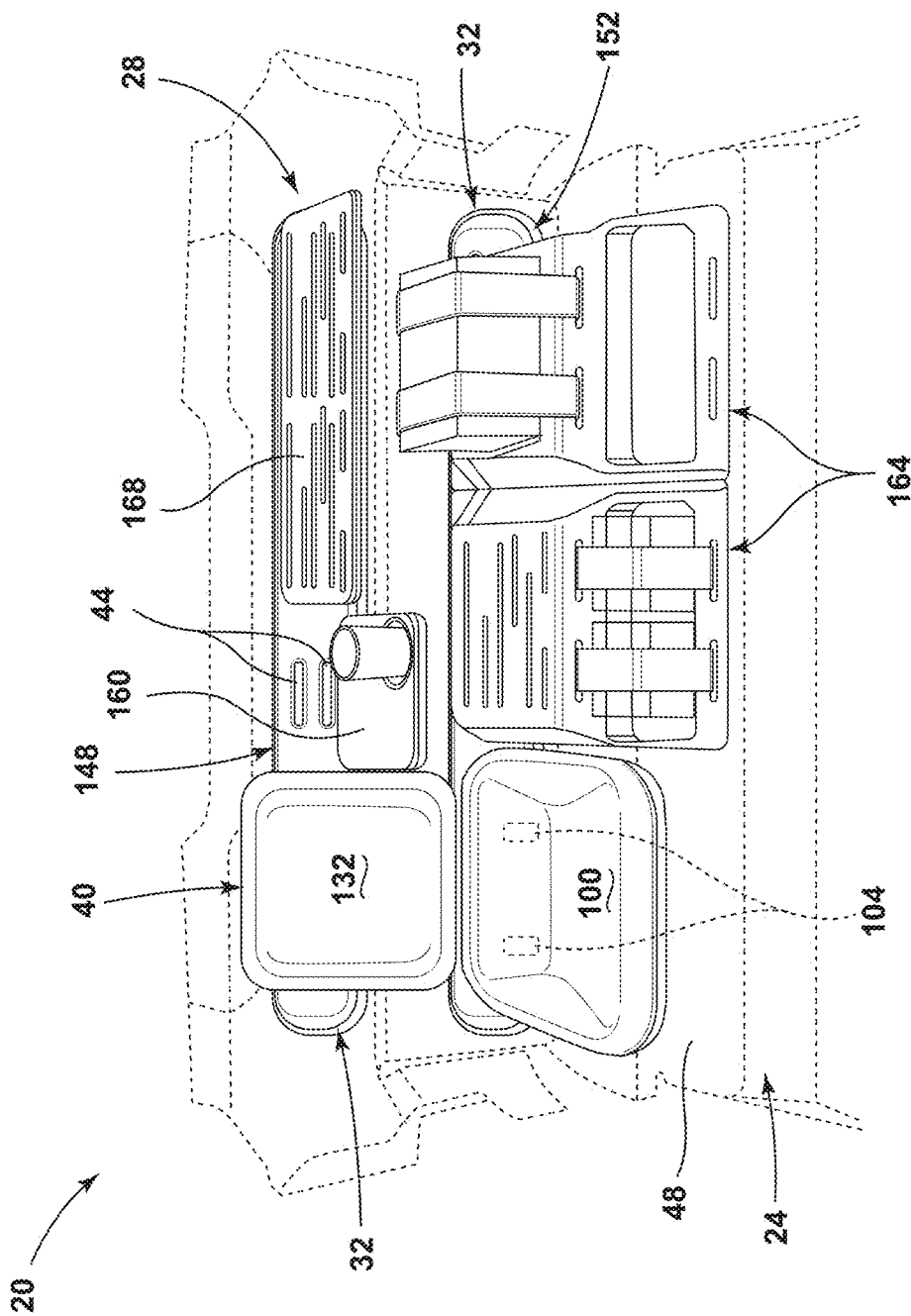
FIG. 12 is a front perspective view of the wall of the passenger compartment, illustrating seating assemblies and various accessories coupled to the plurality of support structures, according to one example.

Referring to FIGS. 10-12, the support structure 32 can include an upper support structure 148 and a lower support structure 152. In such an example, the upper support structure 148 and the lower support structure 152 may each be provided with the series of slots 36. Said another way, the series of slots 36 may be defined in each of the upper support structure 148 and the lower support structure 152. In various examples, the upper support structure 148 may correspond with a designed positioning of the seatback 132 of the seating assembly 40 and the lower support structure 152 may correspond with a designed positioning of the seat 100 of the seating assembly 40. It is contemplated that the upper support structure 148 and/or the lower support structure 152 may be provided with an upper row of slots 44 and a lower row of slots 44. In such an example, the upper and lower rows of slots 44 may provide alternative positioning for the seatback 132 and/or the seat 100 of the seating assemblies 40. Additionally, or alternatively, the upper and lower rows of slots 44 may be employed to accomplish the stowed position of the seat 100 that was depicted and discussed with regard to FIGS. 1 and 2.

Referring again to FIGS. 10-12, the engagement of the seat 100 with the lower support structure 152 and the engagement of the seatback 132 with the upper support structure 148 can enable the seat 100 and the seatback 132 to be independently suspended above the floor 48 of the passenger compartment 24. In various examples, the seating assemblies 72 may be referred to as primary seating assemblies. As discussed above, the seat engagement members 104 can be configured for coupling to the rear side of the primary seating assembly (e.g., seating assembly 72), with such coupling of the seat 100 to the rear side of the primary seating assembly enabling the auxiliary seating assembly 88. It is contemplated that the seatback engagement members 146 may be configured for engagement with the rear side of the seatback 80 of the seating assembly 72 such that the auxiliary seating assembly 88 may be fully removable from the primary seating assembly (e.g., seating assemblies 72). Accordingly, in some examples, the auxiliary seatback 92 can be positionable upon the wall 28 of the passenger compartment 24. The wall 28 of the passenger compartment 24 that is provided with the support structure(s) 32 may be a rear wall of the passenger compartment 24. A variety of accessories may be configured for engagement with at least one of the slots 44 of the series of slots 36. For example, the work surface 136 discussed with respect to FIG. 6 may be one such accessory. Other accessories that may be configured for engagement with at least one of the slots 44 of the series of slots 36 can include, but are not limited to, a side table 160, cargo management assemblies 164, and/or bench-style seatbacks 168.

With specific reference to FIG. 12, the seat engagement members 104 can be configured for coupling to a location on the vehicle 20 that is remote from the passenger compartment 24. For example, the location on the vehicle 20 that is remote from the passenger compartment 24 may be a cargo area of the vehicle 20. In one specific example, the cargo area may be a bed area of a pickup truck. The seat 100 of the seating assembly 40 may be received in the location that is remote from the passenger compartment 24 in a manner that enables alternative seating arrangements. For example, the seat 100 of the seating assembly 40 may be removed from the passenger compartment 24 and positioned in the cargo area to enable comfortable social interaction within a region of the vehicle that is not commonly used as an occupant-centric area. In the depicted examples, the seat 100 of one or more of the seating assemblies 40 can be positioned within the cargo area (e.g., during tailgating activities, at a job site, and so on). In such examples, the vehicle 20 may be provided with the ability to prevent a transmission from shifting into a gear that facilitates motion of the vehicle 20 (e.g., drive or reverse) while the passenger compartment 24 is arranged. While all modern OEMs of passenger vehicles currently warn occupants against sitting in the bed of a pickup truck while the vehicle 20 is moving, it is anticipated that technology and the regulatory framework may evolve in the future to where such an activity is safe and permissible.

Referring again to FIG. 12, to enable the seating arrangements within the cargo area, a seat base may be provided in one or more locations of the cargo area. The seat base can include a support panel and a leg portion. The support panel of the seat base can be pivotably coupled to a sidewall of the vehicle 20. For example, the sidewall may be a sidewall within a bed area of a pickup truck. In such an example, the seat base may be accessible when the vehicle 20 is in the stationary non-moving state. The pivotable coupling of the seat base to the sidewall of the vehicle 20 may be enabled by a rod that is coupled to the support panel. The rod may define a rotation axis of the support panel relative to the sidewall. The leg portion is rotatably coupled to the support panel at an end of the support panel that is opposite to the rod. Accordingly, the seat base can be transitioned between a stowed position and a deployed position by way of rotational motion.

Referring further to FIG. 12, the leg portion includes a first leg and a second leg. In the deployed position, the first and second legs of the leg portion extend downwardly from the support panel to engage with a cargo floor of the cargo area. A cross member extends between the first leg and the second leg. The cross member may provide additional structural rigidity to the leg portion. In the stowed position, the cross member may be received within a notch that is defined by an underside of the support panel. The support panel may be used as a seat by a user while the vehicle 20 is in the stationary non-moving state. In various examples, the seat engagement members 104 may be configured for coupling with the rod such that the seat 100 of the seating assembly 40 may be coupled to, and retained, upon the support panel of the seat base to provide a degree of cushioning to the user. Additionally, or alternatively, an underside of the seat 100 may be contoured to engage or otherwise receive the support panel such that positioning and/or retention of the seat 100 to the seat base may be enabled. In various examples the seat 100 and/or the seatback 132 of the seating assemblies 40 may be provided with trim coverings that are made from weather-resistant textiles. In such examples, the user may transition the seat 100 of the seating assembly 40 between interior (e.g., within the passenger compartment 24) and exterior (e.g., outside of the passenger compartment 24) with a decreased probability of weather-related damage occurring to the seat 100 and/or the seatback 132.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle, comprising:
   a passenger compartment;
   a wall positioned within the passenger compartment;
   a support structure positioned on the wall, wherein the support structure defines a series of slots; and
   a seating assembly that engages at least one of the slots of the series of slots such that the seating assembly is suspended above a floor of the passenger compartment;
   wherein the seating assembly comprises a seat, wherein the seat comprises a seat engagement member that is received within one of the slots of the series of slots; and
   wherein the seat engagement member is configured for coupling to a rear side of a primary seating assembly, and wherein such coupling of the seat to the rear side of the primary seating assembly enables an auxiliary seating assembly.

2. The vehicle of claim 1, wherein the seat of the seating assembly is movable between a stowed position and a deployed position.

3. The vehicle of claim 2, wherein the stowed position of the seat and the deployed position of the seat are displaced from one another by a rotation of the seat about an axis that is parallel to a longitudinal axis of the vehicle.

4. The vehicle of claim 3, wherein the seat is rotated by at least about ninety degrees when the seat is transitioned between the stowed position and the deployed position.

5. The vehicle of claim 4, wherein the seat is rotated by about one-hundred-eighty degrees when the seat is transitioned between the stowed position and the deployed position.

6. The vehicle of claim 1, wherein a surface of the wall provides a seatback of the seating assembly.

7. The vehicle of claim 1, wherein the support structure comprises an upper support structure and a lower support structure, and wherein the series of slots are defined by each of the upper support structure and the lower support structure.

8. The vehicle of claim 7, wherein the seating assembly comprises a seat, and wherein the seat comprises a seat engagement member that is received within one of the slots of the series of slots defined by the lower support structure.

9. The vehicle of claim 8, wherein the seating assembly comprises a seatback, and wherein the seatback comprises a seatback engagement member that is received within one of the slots of the series of slots defined by the upper support structure.

10. The vehicle of claim 9, wherein the seat and the seatback are each independently suspended above the floor of the passenger compartment.

11. The vehicle of claim 1, wherein the seat engagement member is configured for coupling to a location on the vehicle that is remote from the passenger compartment.

12. The vehicle of claim 1, wherein the auxiliary seating assembly comprises an auxiliary seatback.

13. The vehicle of claim 12, wherein the auxiliary seating assembly comprises auxiliary side bolsters that extend from an upper edge of the auxiliary seatback downwardly along at least a portion of right and left sides of the auxiliary seatback.

14. The vehicle of claim 1, further comprising:
   an accessory that is configured for engagement with at least one of the slots of the series of slots.

15. A vehicle, comprising:
   a passenger compartment;
   a wall positioned within the passenger compartment;
   a support structure positioned on the wall, wherein the support structure defines a series of slots; and
   a seating assembly that engages at least one of the slots of the series of slots such that the seating assembly is suspended above a floor of the passenger compartment, wherein the seating assembly comprises a seat, wherein the seat comprises a seat engagement member that is received within one of the slots of the series of slots, wherein the seat of the seating assembly is movable between a stowed position and a deployed position, wherein the stowed position of the seat and the deployed position of the seat are displaced from one another by a rotation of the seat about an axis that is parallel to a longitudinal axis of the vehicle, and wherein the seat engagement member is configured for coupling to a rear side of a primary seating assembly, and wherein such coupling of the seat to the rear side of the primary seating assembly enables an auxiliary seating assembly.

16. The vehicle of claim 15, wherein the seat is rotated by about one-hundred-eighty degrees when the seat is transitioned between the stowed position and the deployed position.

17. The vehicle of claim 15, wherein the seat engagement member is configured for coupling to a location on the vehicle that is remote from the passenger compartment.

* * * * *